H. SPURLING.
EAR TAG.
APPLICATION FILED APR. 26, 1919.

1,320,426.

Patented Nov. 4, 1919.

WITNESSES
R. E. Rousseau

H. Spurling
INVENTOR

BY
Munn & Co.
ATTORNEYS

UNITED STATES PATENT OFFICE.

HARRY SPURLING, OF TAYLORVILLE, ILLINOIS.

EAR-TAG.

1,320,426.   Specification of Letters Patent.   Patented Nov. 4, 1919.

Application filed April 26, 1919. Serial No. 292,800.

*To all whom it may concern:*

Be it known that I, HARRY SPURLING, a citizen of the United States, and a resident of Taylorville, in the county of Christian and State of Illinois, have made certain new and useful Improvements in Ear-Tags, of which the following is a specification.

This invention relates to an improvement in ear tags for swine.

For the convenience of buyers at public auctions, it is necessary to mark the animals on exhibit for purposes of ready identification. In common practice, a metallic tag or label bearing the identification mark or number is attached to the ear of the animal. A number of such tags or labels are in use, but have proven more or less unsatisfactory by reason of the fact that they either irritate the animal by causing the ear to burn, or easily become lost or pulled out.

The principal object of my invention is to provide an improved ear tag or label which will at all times expose the identification number or mark to plain view, and which will not irritate the animal and which further will not become readily lost or torn out of place.

A further object of the invention is to provide an improved device of the class described which will be extremely simple, durable and efficient in operation, and inexpensive to manufacture.

Figure 1:
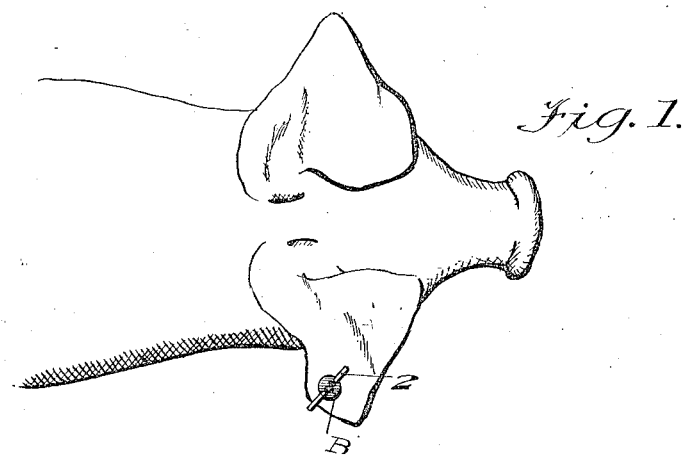
Figure 2:
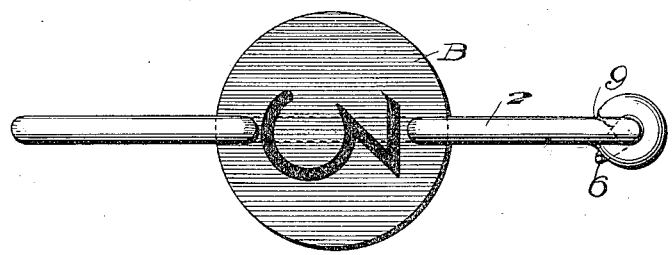
Figure 3:
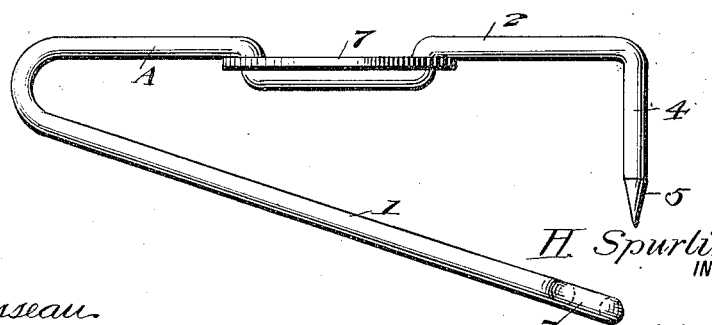

With these and other objects in view which will become apparent as the description proceeds, the invention resides in the construction, combination and arrangement of parts hereinafter more fully described and claimed, and illustrated in the accompanying drawings in which like characters of reference indicate like parts throughout the several figures, and in which:

Figure 1 represents a top plan view of the tag showing same in position in the ear of the animal, Fig. 2 represents an enlarged plan view of the invention, and Fig. 3 is a side elevational view thereof.

Referring more particularly to the drawing, the tag or label includes a fastener A and an identification plate B. The fastener is formed preferably of a length of resilient wire, which is round in cross section, and which is bent upon itself to form the arms 1 and 2. The arm 1, is straight and is terminated at its free end in an eye 3. The arm or finger 2, is bent at its free end toward the back 1 as at 4, and is pointed as at 5 to form a prong for piercing the ear of the animal to which the tag is to be secured.

The prong is arranged in such position with respect to the eye that when the arms of the fastener are pressed together, the prong pierces the ear of the animal and projects through the eye. The prong may then be crimped or bent over the eye as indicated at 6 whereby to form a fastening to prevent disengagement of the fastener.

The identification plate B is carried by the arm or finger and on this plate identification numerals or marks are placed. The plate is provided at diametrically opposite points with openings through which the wire forming the fastening is passed, the portion 8 of the wire passing beneath the identification plate, resting flat against it so as to effectively hold against movement relatively to the arm or finger 2.

In operation, the fastener in open position is fitted over the edge of the ear of the hog, with the identification plate uppermost. The arms of the fastener are then closed together, the prong 4 piercing the ear of the animal and extending into the eye 3, against which the point is bent or clenched in order to lock the arms of the fastener together. The process of piercing the ear and locking the point over the eye may be accomplished by use of a special tool, which forms the subject of a separate application.

The point when clenched is preferably bent at an angle with respect to the finger 2 rather than in co-planar relation therewith, in order that there will be no danger of the point pulling out between the meeting ends 9 of the eye. It will be understood that the ear is not clamped between the arms of the fastener, and thus no discomfort is caused the animal except that incident to the piercing of the ear.

Furthermore, there is no danger of the arms being accidentally bent or moved together in such position as to clamp the ear between them, since the resiliency of the wire will at all times keep the arms sufficiently separated to prevent their being brought together enough to engage or clamp the ear between them.

By reason of the fact that the two arms, when the device is in position, are positively locked against separation, danger of loss of the tag from the ear is reduced to a minimum.

It will be noted that the point 5 of the wire is long and gradually tapering so that in forcing it through the eye, with the use of the tool described in a separate application, it will readily bend sidewise and be clenched around the eye.

Although I have described the preferred embodiment of my invention, I may desire to make such changes in the construction, combination and arrangements of parts thereof, as do not depart from the spirit of the invention and the scope of the appended claim.

I claim:—

A device of the character described comprising a plate bearing identification indicia and provided with a pair of holes, in combination with an attaching member including a pair of normally diverging arms formed of resilient material, the end of one arm being formed as an eye and the end of the other arm being formed with a lateral extension terminating in a penetrating point adapted for passage through and subsequent clenching about said eye.

HARRY SPURLING.

Witnesses:
JAMES H. FORRESTER,
LUTHER CHESNUT.

Copies of this patent may be obtained for five cents each, by addressing the "Commissioner of Patents, Washington, D. C."